United States Patent [19]

Ishida et al.

[11] Patent Number: 4,520,776
[45] Date of Patent: Jun. 4, 1985

[54] INTAKE PORT STRUCTURE FOR INTERNAL COMBUSTION ENGINES

[75] Inventors: Tokuzi Ishida, Hamamatsu; Kiyotaka Aono, Toyooka, both of Japan

[73] Assignee: Suzuki Jidosha Kogyo Kabushiki Kaisha, Kami, Japan

[21] Appl. No.: 596,563

[22] Filed: Apr. 4, 1984

Related U.S. Application Data

[63] Continuation of Ser. No. 430,063, Sep. 30, 1982, abandoned.

[30] Foreign Application Priority Data

Feb. 8, 1982 [JP] Japan .................. 57-17420

[51] Int. Cl.³ .............................. F02B 31/00
[52] U.S. Cl. ..................... 123/308; 123/432
[58] Field of Search ........... 123/432, 306, 308, 188 M

[56] References Cited

U.S. PATENT DOCUMENTS

| | | | |
|---|---|---|---|
| 3,087,480 | 4/1963 | Baudry | 123/432 |
| 3,678,905 | 7/1972 | Diehl | 123/432 |
| 4,265,207 | 5/1981 | Hayashida | 123/432 |
| 4,271,801 | 6/1981 | Yamakawa et al. | 123/308 |
| 4,286,561 | 9/1981 | Tsutsumi | 123/308 |

FOREIGN PATENT DOCUMENTS

| | | | |
|---|---|---|---|
| 52220 | 4/1979 | Japan | 123/308 |
| 78124 | 6/1980 | Japan | 123/308 |
| 91719 | 7/1980 | Japan | 123/308 |
| 93922 | 7/1980 | Japan | 123/308 |
| 104520 | 8/1980 | Japan | 123/308 |
| 160122 | 12/1980 | Japan | 123/306 |
| 2069042 | 7/1981 | United Kingdom | 123/308 |

Primary Examiner—Ira S. Lazarus
Assistant Examiner—R. S. Bailey
Attorney, Agent, or Firm—Flynn, Thiel, Boutell & Tanis

[57] ABSTRACT

An intake port structure comprises a cylinder head including combustion chambers and supporting an intake valve and an ignition plug in each of the combustion chambers, the intake valve having a stem slidably supported by the cylinder head, the cylinder head having a joint surface to which an intake manifold is connected. A primary intake passage is defined in the cylinder head and communicates with each of the combustion chambers, the primary intake passage having a primary intake port directed toward the stem and the ignition plug, and an opening at the joint surface. The opening has a central axis extending at an angle smaller than 90° with respect to the joint surface. The primary intake passage is smoothly curved between the primary intake port and the opening. The intake manifold has a plurality of primary manifold branches arranged substantially symmetrically with respect to a central axis of the intake manifold.

1 Claim, 4 Drawing Figures

INTAKE PORT STRUCTURE FOR INTERNAL COMBUSTION ENGINES

This application is a continuation of U.S. Ser. No. 430,063, filed Sept. 30, 1982, now abandoned.

BACKGROUND OF THE INVENTION

The present invention relates to an intake port structure for an internal combustion engine having a plurality of cylinders.

Fuel distribution among cylinders of a multiple-cylinder internal combustion engine is governed by a vacuum developed in intake passages or the characteristics of an air flow by which fuel vapor is carried. To provide uniform fuel distribution among the cylinders, various means have been proposed for use in intake passages following a common intake passage of an intake manifold. The intake passages are normally arranged asymmetrically to cause an air-fuel mixture to flow in a direction tangential to the peripheral wall of each engine cylinder. Addition of the means for uniform fuel distribution to such asymmetrical intake passages results in increased resistance to the flow of the air-fuel mixture in some intake passages, with the consequence that engine performance will become poor.

SUMMARY OF THE INVENTION

It is an object of the present invention to provide an intake port structure for an internal combustion engine having a plurality of cylinders, the intake port structure being so shaped that a primary intake manifold has manifold branches arranged symmetrically with respect to a central axis of the intake manifold for improved fuel distribution among the engine cylinders.

Another object of the present invention is to provide an intake port structure for multiple-cylinder internal combustion engines which is simple in construction, lightweight, and less costly.

Still another object of the present invention is to provide an intake port structure for multiple-cylinder internal combustion engines which can reinforce an air-fuel mixture swirl in combustion chambers for easy ignition when the engine operates under low and medium loads, to thereby improve drivability, exhaust purification, and heat efficiency.

According to the present invention, an intake port structure for an internal combustion engine having a plurality of cylinders, comprising a cylinder head including combustion chambers and supporting an intake valve and an ignition plug in each of the combustion chambers, the intake valve having a stem slidably supported by the cylinder head, the cylinder head having a joint surface to which an intake manifold is connected, a primary intake passage defined in the cylinder head and communicating with each of the combustion chambers, the primary intake passage having a primary intake port directed toward the stem and the ignition plug, and an opening at the joint surface, the opening having a central axis extending at an angle smaller than 90° with respect to the joint surface, the primary intake passage being smoothly curved between the primary intake port and the opening, and a secondary intake passage defined in the cylinder head and communicating with each of the combustion chambers, the primary intake port opening into the secondary intake passage. The intake manifold comprises a plurality of primary manifold branches each communicating with the primary intake passage, the primary manifold branches being arranged symmetrically with respect to a central axis of the intake manifold.

During operation of the engine under low and medium loads, fuel distribution among the engine cylinders is rendered uniform and a strong air-fuel mixture swirl is created in each combustion chamber due to a Karman vortex street caused by the intake valve stem. Therefore, fuel combustion can be improved evenly in the combustion chambers to thereby prevent an engine power loss and improve lean mixture limitations, so that fuel economy and drivability can be improved and harmful pollutants in the exhaust gas can be reduced. Furthermore, the intake port structure of the invention is simple in construction, lightweight, and less costly.

The primary intake passage has a straight end portion leading to the primary intake port and having a length greater than the diameter of the primary intake port. This arrangement prevents the air-fuel mixture as discharged out of the primary intake port from spreading and slowing down. Thus, the directivity of the air-fuel mixture as it is supplied from the primary intake passage into the combustion chamber is improved to thereby strengthen an air-fuel mixture swirl formed therein for improved fuel combustion.

The above and other objects, features and advantages of the present invention will become more apparent from the following description when taken in conjunction with the accompanying drawings in which a preferred embodiment of the present invention is shown by way of illustrative example.

DETAILED DESCRIPTION

Figure 1:
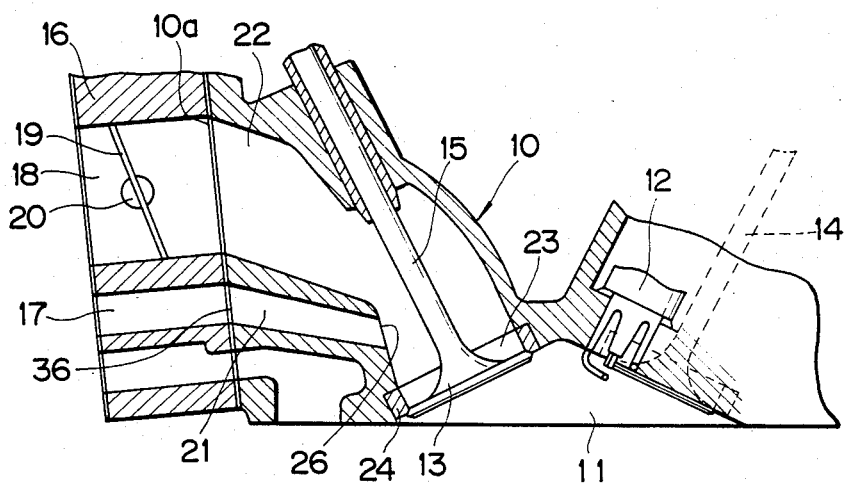
FIG. 1 is a fragmentary cross-sectional view of an internal combustion engine in which an intake port structure according to the present invention is incorporated.
Figure 2:
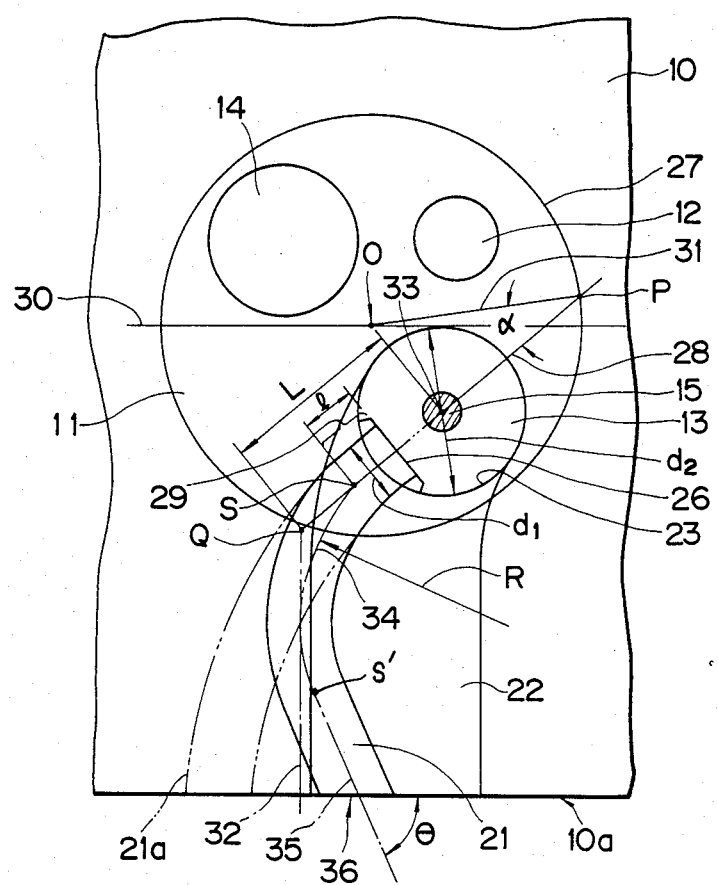
FIG. 2 is an enlarged plan view of an intake port of the intake port structure shown in FIG. 1.

As illustrated in FIGS. 1 and 2, a cylinder head 10 has a combustion chamber 11 and supports an ignition plug 12 and a pair of intake and exhaust valves 13, 14, the intake valve 13 having a stem 15 slidable in the cylinder head 10. A throttle valve block 16 is attached to the cylinder head 10 at its joint surface 10a, and has a primary intake passage 17 for supplying the combustion chamber 11 with an air-fuel mixture when the engine operates under a full range of loads, and a secondary intake passage 18 for supplying the combustion chamber 11 with an air-fuel mixture when the engine operates under relatively higher loads, the primary and secondary intake passages 17, 18 communicating with primary and secondary intake passageways 38, 39, respectively, of a two-barrel carburetor 37 (FIG. 4) via an intake manifold 40. A throttle valve 19 is pivotably mounted by a shaft 20 in the secondary intake passage 18 in the throttle valve block 16.

The cylinder head 10 has a primary intake passage 21 communicating with the primary intake passage 17 in the throttle valve block 16 and a secondary intake passage 22 communicating with the secondary intake passsage 18 in the throttle valve block 16, the secondary intake passage 22 having a secondary intake port 23 opening into the combustion chamber 11. The secondary intake port 23 has a valve seat 24 against which the intake valve 13 can be held, as shown in FIG. 1. The primary intake passage 21 has a primary intake port 26 opening into the secondary intake passage 22 immediately upstream of the secondary intake port 23.

As shown in FIG. 2, the primary intake passage 21 is curved to direct the primary intake port 26 toward the stem 15 of the intake valve 13 in a direction substantially tangential to a peripheral edge 27 of the combustion chamber 11 and substantially toward the ignition plug 12. More specifically, the primary intake port 26 has a center line 28 intersecting the peripheral edge 27 at a point P which is located more closely than the ignition plug 12 to the axis 30 of a crank shaft (not shown). The point P is connected to the center O of the combustion chamber 11 by a straight line 31 extending at an angle of $\alpha$ with respect to the center line 28, the angle $\alpha$ being in the range of from 20° to 30°. A point Q which will serve to determine an auxiliary center line 32 is determined on the center line 28 as follows: The stem 15 of the intake valve 13 has a central axis 33, and the point Q is spaced upstream from the central axis 33 by a distance L which is greater than a diameter $d_2$ of the secondary intake port 23 of the secondary intake passage 22. The auxiliary center line 32 extends through the point Q normal to the axis 30 of the crank shaft.

Figure 4:
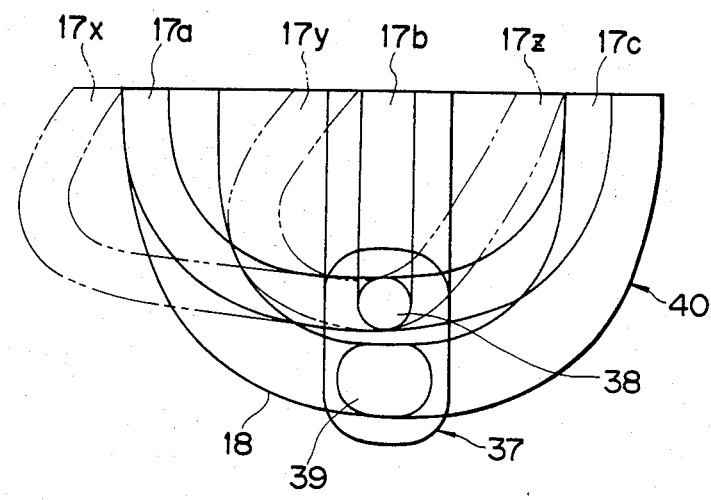
FIG. 4 is a plan view of an intake manifold constituting part of the intake port structure of the present invention.

Then, an arc 34 is determined which is tangentially in the center lines 28, 32 and has a radius of curvature R. The arc 34 has an end S tangentially to the center line 28, and a straight line 35 is drawn in tangential relation to the other end of the arc 34 at a point S' which is spaced from the region of the arc which is inscribed between lines 28 and 32. The straight line 35 serves as a center line of an opening 36 the primary intake passage 21. The center line 35 extends at an angle of $\theta$ with respect to the joint surface 10a of the cylinder head 10 or the axis 30 of the crank shaft, the angle $\theta$ being smaller than 90°. The primary intake passage 21 thus has a center line composed of the center line 28, the arc 34 and the center line 35 which are smoothly joined together. A prior known primary intake passage 21a has had a curved central axis having a larger radius of curvature as shown in FIG. 2. With the primary intake passage 21 thus curved, primary intake manifold branches 17a, 17b, 17c are arranged substantially symmetrically with respect to a central axis of the manifold 40 as shown in FIG. 4. A conventional intake manifold has had its primary intake branches 17x, 17y, 17z curved asymmetrically with respect to the central axis of the intake manifold. The primary intake passage 21 thus curved can direct an air-fuel mixture supplied therefrom tangentially to the peripheral edge 27 and toward the ignition plug 12 into the combustion chamber 11.

To ensure that the air-fuel mixture can flow in such a direction, the primary intake passage 21 has a straight end portion 29 having a sufficiently large length l. More specifically, the length l is equal to a distance between the end S of the arc 34 and the intake passage port 26 and is greater than a diameter $d_1$ of the straight end portion 29.

The above relations are, as illustrated by FIG. 2, within a plane which is perpendicular to the central axis O of the combustion chamber.

Operation of the intake port structure thus constructed is as follows: When the engine operates under a low and medium load range, an air-fuel mixture flows from primary intake passageway 38 through each of the primary intake manifold branches 17a, 17b, 17c (FIG. 4) and the primary intake passage 21 into the combustion chamber 11. Since the primary intake manifold branches 17a, 17b, 17c are symmetrically arranged, as shown in FIG. 4, resistance to the flow of the air-fuel mixture therethrough is held to a minimum, and the air-fuel mixture can be distributed evenly among the engine cylinders. Accordingly, fuel combustion in the cylinders and hence fuel economy are improved by a relatively simple intake passage construction.

With the center line 28 of the primary intake port 26 of the primary intake passage 21 being oriented at 20°-30° to the line 31, the primary intake port 26 is directed tangentially to the peripheral edge 27 of the combustion chamber 11 and toward the ignition plug 12. The air-fuel mixture discharged from the primary intake port 26 thus creates a swirl due to a Karman vortex street caused by the stem 15 of the intake valve 13, so that the speed of combustion of fuel in the combustion chamber 11 can be increased for improved fuel combustion.

Figure 3:
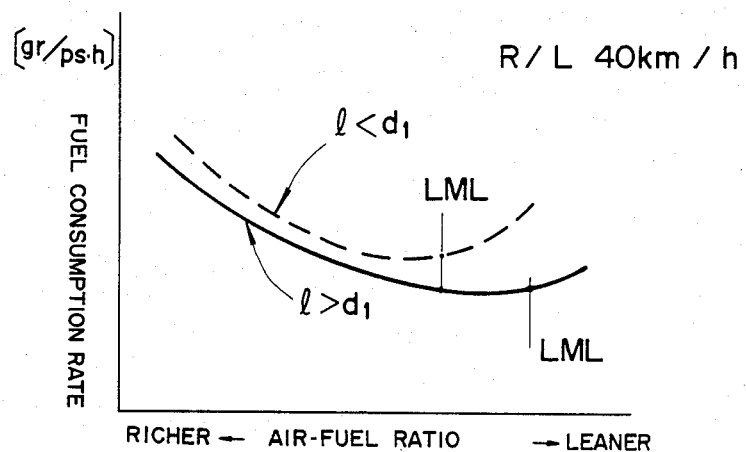
FIG. 3 is a graph showing relationships between fuel consumption rate and air-fuel ratio.

Since the length l of the straight end portion of the primary intake passage 21 is sufficiently long as compared with the area of opening of the primary intake port 26, the air-fuel mixture as it emerges from the primary intake port 26 is prevented from spreading radially outwardly, and hence can be oriented coherently and flow at a high speed. As shown in FIG. 3, fuel consumption rates plotted against air-fuel ratios when $l > d_1$ are lower than those against air-fuel ratios when $d_1$, and become much lower as the air-fuel mixture is leaner, to thereby raise a lean mixture limitation (LML). This improved lean mixture limitation results from a reinforced air-fuel mixture swirl due to the increased directivity of the air-fuel mixture as discharged from the primary intake port 26, and results in better fuel economy.

When the engine operates under higher loads, a large amount of air-fuel mixture flows out of the secondary intake passage 22 into the combustion chamber 11. Since the secondary intake passage 22 is not adversely affected by the intake port structure of the present invention, the charging efficiency of the secondary intake passage 22 remains the same and the performance of the engine under a full load is not impaired.

Although a certain preferred embodiment has been shown and described in detail, it should be understood that many changes and modifications may be made therein without departing from the scope of the appended claims.

What is claimed is:

1. An intake port structure for an internal combustion engine having a plurality of cylinders, comprising:
    (a) a cylinder head including combustion chambers each having a longitudinal central axis and supporting an intake valve and an ignition plug in each of said combustion chambers, said intake valve having a stem slidably supported by said cylinder head, said cylinder head having a joint surface;
    (b) a primary intake passage defined in said cylinder head and communicating with each of said combustion chambers, said primary intake passage having one end defining a primary intake port directed toward said stem and said ignition plug, said primary intake passage at the other end terminating in an opening at said joint surface;

(c) a secondary intake passage defined in said cylinder head and communicating with each of said combustion chambers, said secondary intake passage having a secondary intake port opening into said combustion chamber, and said primary intake port opening into said secondary intake passage;

(d) a two-barrel carburetor having a primary intake passageway for supplying air-fuel mixture to the combustion chambers under a full range of loads and a secondary intake passageway for supplying an air-fuel mixture to the combustion chambers under higher loads, and an intake manifold connected to said joint surface of said cylinder head and to said carburetor, said intake manifold having a plurality of primary branches each of which provides communication from the primary intake passageway to a respective said primary intake passage, said primary branches being arranged symmetrically with respect to a central axis of the intake manifold, said intake manifold also having a plurality of secondary branches each of which provides communication from said secondary intake passageway to a respective said secondary intake passage;

(e) said primary intake passage having a first straight end portion leading to said primary intake port and having a length which is greater than the diameter of said primary intake port, said first straight end portion having a first longitudinal center line which when extended outwardly beyond the primary intake port first intersects the stem of the intake valve and then intersects the periphery of the combustion chamber at a point thereon, said point being connected to the longitudinal center axis of said combustion chamber by a straight line which extends at an angle ranging from 20° to 30° with respect to said first center line when viewed in a plane which extends perpendicular to the longitudinal central axis of said cylinder;

(f) said primary intake passage including a second straight end portion which terminates in said opening at said joint surface, and a smoothly curved arcuate central portion which connects said first and second straight end portions, said arcuate central portion having an arcuate central axis which tangentially contacts said first center line and at a location spaced therefrom also tangentially contacts an imagery straight working line which extends perpendicularly with respect to said joint surface and intersects said first center line at a working point which is adjacent but spaced outwardly from the periphery of said cylinder, said working point being spaced from the longitudinal axis of the intake valve stem by a distance which is greater than the diameter of the secondary intake port, and said arcuate central portion continuing to smoothly curve outwardly beyond its tangential contact with said working line for connection with said second straight end portion;

(g) said second straight end portion having a second longitudinal center line which tangentially contacts said arcuate central axis and which intersectingly extends at an angle of less than 90° with respect to said joint surface when viewed in said plane which is perpendicular to said longitudinal central axis.

* * * * *